United States Patent [19]

Traver et al.

[11] Patent Number: 4,600,436

[45] Date of Patent: Jul. 15, 1986

[54] DURABLE SILICONE EMULSION POLISH

[75] Inventors: Frank J. Traver, Troy; Raymond J. Thimineur, Scotia; Anthony A. Zotto, Troy, all of N.Y.

[73] Assignee: General Electric Company, Waterford, N.Y.

[21] Appl. No.: 613,112

[22] Filed: May 22, 1984

Related U.S. Application Data

[63] Continuation-in-part of Ser. No. 424,260, Sep. 27, 1982.

[51] Int. Cl.⁴ .................................................. C09G 1/06
[52] U.S. Cl. ........................................ 106/3; 524/837; 524/838; 525/100; 525/102
[58] Field of Search .................. 106/3, 287.13, 287.15; 524/837, 838; 525/100, 102

[56] References Cited

U.S. PATENT DOCUMENTS

| | | | |
|---|---|---|---|
| 2,891,920 | 6/1959 | Hyde et al. | 524/837 |
| 3,960,575 | 6/1976 | Martin | 106/287.11 |
| 4,246,029 | 1/1981 | Sanders, Jr. | 106/287.13 |
| 4,288,356 | 9/1981 | Huebner et al. | 525/102 |

Primary Examiner—Amelia B. Yarbrough
Attorney, Agent, or Firm—Gary L. Loser

[57] ABSTRACT

Aminofunctional emulsions and aminofunctional silicone polishes are provided which exhibit improved adhesion and resistance to removal by detergent washing when applied to solid surfaces.

58 Claims, No Drawings

DURABLE SILICONE EMULSION POLISH

The present application is a continuation-in-part of copending patent application Ser. No. 424,260, filed Sept. 27, 1982.

BACKGROUND OF THE INVENTION

This invention relates to polishes. More particularly, it relates to silicone emulsion polishes and dressings which form detergent-resistant, durable protective coatings on solid surfaces.

The present invention also relates to the preparation of the emulsions and polishes of the present invention by the process of emulsion polymerization.

Silicone emulsion polishes and dressings, commonly used to improve the appearance of and to protect household products, luggage, fabrics, marine and auto vinyl, sporting goods, and the like, are favored for their glossiness and ease of application; however, they lack durability, especially after detergent washing, and must be frequently reapplied.

Amine-catalyzed resinous polysiloxane wood varnishes are disclosed in U.S. Pat. No. 3,350,349 to Hyde (incorporated herein by reference), but their application, varnish-like properties and the resultant hard, dry film make them unsuitable for many polishing needs.

Sanders, U.S. Pat. Nos. 4,246,029 and 4,247,330, discloses an aqueous emulsion containing (1) a mixture of silicone compounds consisting of (a) an aminofunctional silicone fluid and (b) a cyclic siloxane, (2) an aliphatic alcohol having from 1 to 4 carbon atoms, (3) sufficient carboxylic acid to neutralize the aminofunctional groups and (4) cationic emulsifying agents, if desired. Such aqueous emulsions are said to be storage stable and suitable for dispensing in automatic car washes to impart a detergent resistant protective coating.

Martin, U.S. Pat. No. 3,960,575, teaches that improved detergent resistant polish compositions can be prepared by adding aminofunctional silicone fluids obtained by equilibrating with cyclic siloxanes to conventional polish compositions.

While each of the foregoing discloses useful polish compositions, the emulsions are prepared by mechanical means well known to those skilled in the art and thus do not possess properties such as durability and resistance to washing to the extent which may be desired. Consequently, there has been a growing need to develop an easily applied polish, suitable for diverse polishing needs, which will exhibit improved durability, resist washings, and afford increased protection to polished surfaces.

The present applicants, in an attempt to overcome the shortcomings of the prior art, prepared emulsions by the process known as emulsion polymerization rather than by the heretofore accepted mechanical methods. Those skilled in the art recognize that emulsions prepared by emulsion polymerization are characterized by extreme stability and extremely fine particle size. Moreover, those skilled in the art appreciate that the problems associated with preparing emulsions by emulsion polymerization are substantially different from those associated with preparing emulsions by mechanical means.

Hyde et al., U.S. Pat. No. 2,891,920, were the pioneers in the field of emulsion polymerization. Hyde et al. recognized that improved emulsions could be prepared by carrying out the polymerization of low molecular weight siloxanes while the siloxanes were dispersed in an aqueous media instead of emulsifying higher molecular weight siloxanes which were dissolved in an organic solvent. In carrying out the method of Hyde et al. the siloxane is first dispersed in the water, preferably with the use of an emulsifying agent, and a suitable polymerization catalyst is thereafter added to promote polymerization to the desired degree. Polymerization is carried out below the boiling point of water, although temperatures above 100° C. can be employed if the polymerization is carried out in a closed system. Hyde et al. reveal that as the polymerization proceeds the viscosity of the siloxane increases but the size of the emulsion droplets decreases and it is believed that this is what causes the extremely stable emulsions obtained by emulsion polymerization.

Oppliger, U.S. Pat. No. 3,208,911, discloses a method for treating hair to improve the appearance, manageability and softness of the hair consisting essentially of submitting the hair to the action of an ionic oil-in-water emulsion, said emulsion being composed of an organosiloxane in an amount of from 0.01 to 90 percent by weight based upon the total weight of the emulsion and an ionic emulsifying agent in an amount of from 2 to 25 percent by weight based upon the weight of the organosiloxane and an alkaline catalyst in an amount of from one alkaline molecule per 100 silicon atoms to one alkaline molecule per 50,000 silicon atoms, inclusive, and the necessary water to give the desired solids content, said alkaline catalyst being selected from the group consisting of (a) $R_4NOH$ and (b) $R_4NX$ admixed with Q, wherein R is alkyl, X is an acid anion, and Q is an alkaline compound selected from the group consisting of ammonia, alkali metal hydroxides, alkali metal carbonates and organic amines, said ionic oil-in-water emulsion being prepared by polymerizing the organosiloxane in an aqueous medium in the presence of said alkaline catalyst until a viscosity of 6.5 cs. to $2.5 \times 10^6$ cs. is obtained.

Findlay et al., U.S. Pat. No. 3,294,725, discloses an emulsion polymerization process similar to that of Hyde et al., however, Findlay et al. teaches the use of a surface active sulfonc acid as a polymerization catalyst rather than a strong mineral acid or strong alkali. A nonionic or anionic emulsifying agent can be employed if so desired.

Axon, U.S. Pat. No. 3,360,491, relates to emulsion polymerization of organosiloxanes wherein the polymerization catalyst is an organic sulfate of the general formula $ROSO_2OH$, wherein R is a monovalent aliphatic hydrocarbon radical of at least 6 carbon atoms. As is the case in Findlay et al., a nonionic or anionic emulsifying agent can be employed if so desired.

Cekada et al., U.S. Pat. No. 3,532,729, teaches the preparation of mercaptosiloxanes by emulsion polymerization.

Sorkin, U.S. Pat. No. 3,624,017, discloses an aqueous emulsion of a copolymer of 80 to 98 mole percent dimethylpolysiloxane and 2 to 20 mole percent $R\ SiO_{3/2}$ in which R is methyl or vinyl, said emulsion having been prepared by emulsion polymerization of a mixture of dimethylpolysiloxane and $R\ SiX_3$, in which X is a hydrolyzable group producing a water soluble by-product such as halogen,

-continued

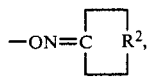

$R^1C(=O)O-$,
$R^1O(R^2O)_n-$ and $-ON(R^1)_2$ in which $R^1$ is a monovalent hydrocarbon or halocarbon radical and $R^2$ is a divalent hydrocarbon or halohydrocarbon radical. It should be noted that the nitrogen-containing radicals of Sorkin are hydrolyzable and hence will not remain bonded to the siloxane chain in an aqueous medium.

Campbell, U.S. Pat. No. 3,634,297, provides a process for binding a pigment to glass fabric which comprises (A) applying to the glass fabric an aqueous emulsion of a copolymer consisting essentially of (a) 50 to 90 mole percent of $(CH_3)_2SiO$ units and (b) 10 to 50 mole percent of $R SiO_{3/2}$ units, wherein R is an alkyl or alkenyl radical of 1 to 3 carbon atoms, the 3,3,3-trifluoropropyl radical, or a phenyl radical, said copolymer having been prepared by emulsion polymerization; and a water dispersible pigment; and (B) drying the glass fabric.

Ikoma, U.S. Pat. No. 3,697,469, describes an emulsion polymerization process involving (i) emulsifying, in water containing a salt-type anionic surface active agent, an organosiloxane of the formula

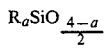

where R is a hydrogen atom or a monovalent hydrocarbon radical or a halogen substituted monovalent hydrocarbon radical, and a has an average value of 1 to 3, and then (ii) contacting said emulsion with an acid-type cationic exchange resin so that said surface active agent may be ion-exchange from salt type into acid type, thereby acquiring catalytic power and at the same time starting the polymerization of said organosiloxane by making said emulsion an acid medium with a pH value of less than 4.

Backderf, U.S. Pat. No. 3,706,697, relates to aqueous emulsion polymerization of acryloxyalkyl-alkoxysilane, alkyl acrylic esters, and optionally other vinyl monomers to provide copolymers curable at low temperatures. The acryloxy functional site of the silane is said unexpectedly not to hydrolyze upon polymerization and thereby serve as a crosslinking site for reaction with the alkyl acrylic ester.

Hilliard, U.S. Pat. No. 3,898,300, describes an emulsion polymerization method to produce a polymeric styrene-acrylonitrile-polyorganosiloxane composition.

Huebner et al., U.S. Pat. No. 4,288,356, discloses a method of blending an emulsion of an emulsion polymerized compolymer of an organic monomer and an organosilicon monomer and an emulsion of a polydiorganosiloxane to provide a reinforced elastomeric product.

The prior art directed to emulsions prepared by emulsion polymerization does not disclose aminofunctional emulsion polymerized polysiloxanes or the use of such polysiloxanes to provide improved polishes. Also, the prior art does not disclose the use of certain ethers as emulsifiers so as to allow utilization of higher temperatures and faster emulsion polymerization. Nor does the prior art disclose the use of cationic catalysts, especially in combinations with the aforementioned ether emulsifying agents, so that emulsion polymerized polysiloxane emulsions can be stripped of cyclic or other low molecular weight siloxanes from which they were prepared. Furthermore, prior art emulsion polymerization processes do not reveal the advantage of including a mixture of alkoxy functional silanes and aminofunctional silanes in the resulting emulsion compositions.

It has now been discovered that aminofunctional silicone polymer emulsions prepared by emulsion polymerization can be used to form easily applied polishes which adhere well to surfaces and resist removal even from many detergent washings. Used as textile finishes, the aminofunctional emulsions impart good hand qualities and water repellency to fabrics.

SUMMARY OF THE INVENTION

Accordingly, it is an object of the present invention to provide an aminofunctional emulsion which is resistant to removal by detergent washing from the surface it is applied to.

It is a further object of the present invention to provide a silicone emulsion polish composition which is easily applied to solid surfaces and resists removal by detergent washing.

It is a further object of the present invention to provide a polish composition which is applicable to a wide range of solid surfaces and which affords good coverage of surface blemishes, good appearance and glossiness, and furnishes a protective coating thereon.

It is still another object of the present invention to provide a method of preparing the silicone emulsion polish compositions of the instant invention.

It is also an object of the present invention to provide improved emulsions prepared by emulsion polymerization of cyclic siloxanes by stripping residual cyclics from the thus prepared emulsion.

These and other objects are provided herein by an aminofunctional silicon emulsion comprising the reaction product of (a) water; (b) an emulsifier or combination of emulsifiers; (c) a diorganopolysiloxane fluid; (d) an aminofunctional silane and (e) optionally, a polymerization catalyst; said emulsion being prepared by emulsion polymerization.

Other features of the present invention will include a silicone emulsion polish comprising the reaction product of
(I) an aminofunctional silicone emulsion comprising:
 (a) water;
 (b) an emulsifier or combination of emulsifiers;
 (c) a diorganopolysiloxane fluid;
 (d) an aminofunctional silane; and
 (e) optionally, a polymerization catalyst; said emulsion being prepared by emulsion polymerization;
in intimate admixture with:
(II) a silicone emulsion comprising:
 (a) a diorganopolysiloxane base polymer fluid having a viscosity of from about 50 to 100,000 centipoise at 25° C.;
 (b) water;
 (c) an emulsifier or combination of emulsifiers.

Processes for preparing the aminofunctional silicone emulsions and silicone emulsion polishes of the present invention are also contemplated.

DETAILED DESCRIPTION OF THE INVENTION

In one aspect of the present invention aminofunctional silicone emulsions are prepared by emulsion polymerizing an aqueous emulsion of a relatively low molecular weight diorganopolysiloxane and an aminofunctional silane. These aminofunctional silicone emulsions may be used alone or combined with conventional silicone emulsions to form easily applied, protective polishes which will exhibit increased adhesion to the surfaces to which they are applied.

A principal starting material for both the aminofunctional emulsion and both components of the silicone emulsion polish of the present invention is a linear diorganopolysiloxane base polymer fluid having a viscosity of up to about 100,000 cps. at 25° C. or a cyclic polysiloxane of the general formula $(R_2 SiO)_{3-9}$ in which the R substituents may be, independently, hydrogen or a hydrocarbon or substituted hydrocarbon group. Of course, mixtures of cyclics, linear siloxanes or both are permissible. Preferably the substituents are aliphatic hydrocarbon groups, including methyl, ethyl, isopropyl, vinyl, allyl, and the like.

Those skilled in the art, of course, appreciate that linear dioganopolysiloxanes are prepared from cyclic polysiloxanes, preferably octamethylcyclotetrasiloxane (referred to in the art as tetramer or methyl tetramer). Both cyclic polysiloxanes and linear siloxanes can readily be prepared by the artisan or be obtained from commercial sources.

For the purposes of this invention, polydimethylsiloxane (PDMS) base polymer fluids are preferred. For the silicone emulsion polish features of the present invention, silanol-endstopped polysiloxanes are most preferred, for reasons to be discussed in more detail hereinafter; however, other polysiloxane base polymer fluids, such as, for example, methyl-endstopped and vinyl-endstopped fluids, are also suitable.

The aminofunctional silanes suitable for preparing the aminofunctional polysiloxane fluids and emulsions of the present invention have the general formula $(RO)_3SiR'Y_n$ in which each R is an alkyl radical of less than 4 carbon atoms, each R' is an aliphatic hydrocarbon radical containing from 3 to 5 carbon atoms and having a valence of n+1 where n is an integer from 1 to 3 and Y is a monovalent radical attached to R' by a carbon-nitrogen bond and composed of hydrogen atoms, nitrogen atoms and up to eight carbon atoms and containing at least one amine group, the ratio of carbon atoms to nitrogen atoms in Y being less than about 6:1. The detailed discussion of these silanes and their preparation appearing in the aforementioned Hyde patent (U.S. Pat. No. 3,350,349) is hereby incorporated by reference.

The preferred aminofunctional silanes include 3-amino-propyltrimethoxysilane, N-2-aminoethyl-3-aminopropyltrimethoxysilane, N,N-diethyl-3-aminopropyltrimethoxysilane and the like. It should be noted that the aminofunctional silanes within the scope of the present invention are not hydrolyzable as are the nitrogen-containing radicals of Sorkin, U.S. Pat. No. 3,624,017.

Emulsification of the polymer is assisted by an emulsifying surfactant (emulsifier) which will promote dispersion of the silicone polymer in an aqueous phase. For the purposes of the present invention, alkylphenoxypolyoxyethylene glycol surfactants, such as octylphenoxypolyoxyethylene glycol (TRITON X405; Rohm & Haas) and nonylphenoxypolyoxyethylene glycol (IGEPAL CO850; GAF); and complex quaternary ammonium salts, such as methylpolyoxyethylene (15) cocoammonium chloride (95%, ETHOQUAD C/25; ARMAK) and dimethylsoyammonium chloride (74%, ARQUAD 2S-75; ARMAK), are preferred, though many other emulsifiers are suitable and will suggest themselves to persons skilled in the art. Combinations of such surfactants may also be used. Those skilled in the art will recognize that certain emulsifiers will also be effective as a polymerization catalyst, e.g. if they make the emulsion sufficiently basic.

It should be noted that the ether-type emulsifiers are particularly preferred as when they are utilized higher reaction temperatures may be employed, thereby increasing the rate of polymerization and allowing stripping of volatiles.

The concentration of the siloxane with respect to the water is not critical. All that is required is that the siloxane be emulsified in an effective amount of water. Thus so long as there is enough water to give a continuous aqueous phase the polymerization will proceed in accordance with the present invention. Although polymerization can be carried out at siloxane concentrations of 1% by weight or less, generally polymerization is effected at siloxane concentrations of 20 to 60% by weight.

The aminofunctional silicone emulsions of the present invention may be easily prepared in one step by an acid or base catalyzed equilibration of cyclic polysiloxane monomers, such as octamethylcyclotetrasiloxane, in water in the presence of an emulsifier (or a combination of emulsifiers) and an aminofunctional silane, i.e. by emulsion polymerization.

Suitable acid and base catalysts are well known to those skilled in the art. Among the preferred catalysts are the strong mineral acids and strong alkalis of Hyde et al., U.S. Pat. No. 2,891,920; the sulfonic acid catalysts of Findlay et al., U.S. Pat. No. 3,294,725, and the organic sulfates of Axon, U.S. Pat. No. 3,360,491. All of these patents are incorporated by reference into the instant disclosure, not only for their teaching as to suitable catalysts, but in their entirety for their broad teaching of how emulsion polymerization can be sucessfully carried out by the artisan. The artisan will appreciate that it is possible for the emulsifier and the polymerization catalyst to be the same compound.

As an example of a preferred emulsion polymerization process, the emulsifier(s), water, and acid or base catalyst, are blended in a single reaction vessel. The polysiloxane monomers are then added and the mixture homogenized, and the heated (if necessary) to begin polymerization. A silanol-end-stopped polysiloxane is formed which will undergo a condensation reaction with the subsequently added aminofunctional silane to yield polymers with terminal aminofunctional silane groups. Neutralization of the catalyst gives an aminofunctional silicone emulsion according to the present invention. It should be understood that the aminofunctional silane can be added before emulsion polymerization begins but preferably it is added subsequently.

It is also likely that the amino-terminated polysiloxanes formed by the emulsion polymerization process of the instant invention further react, e.g. condense, so as to yield polysiloxanes having amino groups on the siloxane chain.

In addition to the foregoing required constituents of the emulsions of the present invention, the present applicants have found that further unexpected results are obtained by including other constituents, discussed more fully hereinbelow, or by stripping the resultant emulsion of residual cyclopolysiloxanes or other volatile polysiloxanes.

In another aspect of the present invention it has surprisingly been discovered that the further addition of alkyltrialkyoxysilane or mixture of such alkyltrialkoxysilanes, preferably such as methyltrimethoxysilane and the like, results in emulsions which impart greater durability to polishes made therefrom. While applicants are not certain of the reason for such improved properties, it is believed that the combination of amino groups and alkoxy groups results in a tighter cure than would be had without such alkoxy groups.

Applicants have further found that it is desirable to include in emulsions prepared by emulsion polymerization in accordance with the present invention, silanes such as gammamethyacryloxypropyltrimethoxysilane or cyanoethyltrimethoxysilane. Such silanes not only provide additional cure or crosslinking sites, but also provide a site for adding other desired moieties to the siloxane chain. That is, the presence of such reactive groups allows the emulsions of the present invention to be utilized as an intermediate compound in addition to being used as a protective coating compound. Those skilled in the art will appreciate that such compounds have the general formula $(RO)_3 SiX$ where R is a $C_{1-8}$ aliphatic organic radical and X is an unsaturated organic radical. Those skilled in the art will readily be able to determine which compounds are within the scope of the foregoing silanes without undue experimentation. Furthermore, it is well within the skill of the artisan to determine how much of such compounds should be included in the emulsion polymerizable compositions in order to obtain the desired properties. Again, it is preferred that the alkyltrialkoxysilane or the unsaturated silane be added after the emulsion polymerization of the polydiorganosiloxane, but if desired it may be added prior to such emulsion polymerization.

In still another aspect of the present invention applicants have found that improved film properties are imparted to polishes prepared in accordance with the instant invention if cyclic polysiloxanes are stripped from the emulsion prepared by emulsion polymerization. It is necessary that the emulsion to be stripped of cyclopolysiloxanes (or other low molecular weight polysiloxane) in accordance with the present invention be emulsion polymerized rather than formed by mechanical means such as colloid milling as such emulsions will break down at the elevated temperatures employed for stripping.

It is further preferred that in addition to employing cationic emulsifiers, that such cationic emulsifiers be ether-type emulsifiers such as alkylphenoxypolyoxyethylene glycols. Ether-type emulsifiers are particularly preferred as they remain effective at high temperatures (i.e. about the 100° C. temperature needed to effect stripping). Other suitable ether-type emulsifiers are well known to the skilled artisan.

The aminofunctional silicone emulsions of the present invention may be used as components in silicone emulsion polish compositions. Suitable polishes according to the present invention would be expected to result, for example, from combining an aminofunctional silicone emulsion of the present invention with an emulsified diorganopolysiloxane fluid, such as a PDMS fluid, which is prepared by methods well known to persons skilled in this art using conventional surfactants and water. Furthermore, it has been discovered herein that combination of the aminofunctional silicone emulsions of the present invention with silanol-endstopped polysiloxane fluid emulsions provides a uniquely servicable and durable protective polish composition. This is believed to be a result of latent condensation between the aminofunctional silane-endstopped polysiloxane emulsion and the SiOH-containing silanol fluid emulsion, leading to a stable, crosslinked product. For the purposes of making silanol-containing silicone emulsion polishes of the present invention, silanol-terminated PDMS fluids having viscosities in the range of about 600 to about 180,000 centistokes are most preferred.

In preparing the silicone emulsion polishes of the present invention, the exact formulation, i.e., the exact proportion of aminofunctional emulsion to silicone emulsion, will depend on several factors including type of polysiloxane fluids used and type of amino functionality. Simple experimentation to match the polish formulation to a given set of conditions is contemplated; however, in the case of aminofunctional PDMS emulsions combined with silanol-stopped PDMS emulsions to form a polish, excellent experimental results have been obtained with aminofunctional emulsion to silanol emulsion ratios in the range of about 1:7 to about 1:12. These ratios should not be considered limiting, however, since improved performance in terms of detergent resistance is noted over a wider range of formulations.

The polish compositions of the present invention, whether of the emulsion type or curable blended fluid type, may contain additional components to lend the polishes desirable qualities which make them useful for specific applications. These additional components include, for example, ultraviolet radiation screens, thickeners, antifoaming agents, antimicrobial agents, additional surfactants, solvents, pigments, and the like.

The emulsion polishes of the present invention offer the further advantage of being shelf stable. The aminofunctional polymers will not crosslink and cure to form their characteristic flexible, glossy protective coating until broken out of the aqueous emulsion phase by physical application to a solid substrate.

In order that those skilled in the art are better able to practice the invention the following examples are provided. The examples are intended to be illustrative only and should not be construed as limiting in any manner.

EXAMPLE 1

Five emulsion polymerized aminofunctional silicone emulsions and two colloid milled silicone oil emulsions were prepared as follows:

Cationic Aminofunctional Emulsion #1

1415 parts by weight deionized water, 100 parts by weight octylphenoxypolyoxyethylene glycol (TRITON X405, Rohm & Haas) emulsifier, 17 parts by weight 95% methylpolyoxyethylene(15) cocoammonium chloride (ETHOQUAD C/25, Armak), and 3 parts by weight KOH pellets were added to a reaction vessel and mixed thoroughly. 875 parts by weight octamethylcyclotetrasiloxane were added to the uniform mixture and blended. The mixture was passed through a colloid mill (5 mil gap) and homogenized at 6000 psig. The resulting emulsion was heated at 95° C. for 4 hours to polymerize the cyclic tetramer. The emulsion was then cooled to 50° C. and 73 parts by weight of 3(2-aminoethyl)aminopropyltrimethoxy silane, in which 8 parts by weight of the ETHOQUAD C/25 emulsifier had been dissolved, were added to the polymerization vessel, and the polymerization allowed to proceed at 50° C. for 1.5 hours longer. Finally, the catalyst was neutralized with 4.2 parts by weight of acetic acid.

Cationic Aminofunctional Emulsion #2

A second aminofunctional emulsion was prepared in the same manner as Emulsion #1, except the following ingredients and quantities were used:
1750 parts by weight cyclic tetramer
200 parts by weight TRITON X405
2750 parts by weight water
34 parts by weight ETHOQUAD C/25
This premix was blended, and 4000 parts by weight were added to a reaction vessel along with 8.4 parts by weight KOH pellets. The mixture was heated at 95° C. for 4 hours, then cooled to 50° C. at which point 191 parts by weight 3(2-aminoethyl)aminopropyltrimethoxy silane with 25 parts by weight ETHOQUAD C/25 dissolved therein were added. The complete mixture was held for 2 hours at 50° C., and then the catalyst was neutralized with acetic acid.

Cationic Aminofunctional Emulsion #3

1000 parts by weight of the cyclic tetramer, 23 parts by weight isopropyl alcohol, 30 parts by weight 74% dimethylsoyaammonium chloride (ARQUAD 2S-75, Armak) 4 parts by weight KOH and 673 parts by weight water were blended until uniform. 30 parts by weight of TRITON X405, 30 parts by weight ETHOQUAD C/25 and 300 parts by weight water were added to the premix, and the complete emulsion heated to 90°-95° C. for 3 hours. 100 parts by weight of 3(2-aminoethyl)aminopropyltrimethoxy silane containing 10 parts by weight TRITON X405 emulsifier were added to the reaction mixture. The reaction mixture was held at 90° C. for 2 hours longer, at which time the catalyst was neutralized with acetic acid.

Anionic Aminofunctional Emulsion #4

1050 parts by weight of the cyclic tetramer, 30 parts by weight dodecylbenzene sulfonic acid and 1719 parts by weight water were blended, then homogenized at 6000 psig. 1982 parts by weight of this homogenized premix were added to a reaction vessel, heated to 90° C. for 2 hours then cooled to 45° C. for 3 hours, after which the polymer viscosity was about 150,000 cps. The emulsion was neutralized with 22 parts by weight triethanol amine. 53 parts by weight TRITON X405 emulsifier followed by 90 parts by weight 3(2-aminoethyl)aminopropyltrimethoxy silane were added to the neutralized emulsion at 45° C. The final solids content was 37.9%, and the emulsion dried to a cured film.

Anionic/Cationic Aminofunctional Emulsion #5

Following the procedures outlined in the preparation of Emulsion #4, 875 parts by weight of the cyclic tetramer, 12.5 parts by weight dodecylbenzene sulfonic acid and 1437.5 parts by weight water were blended and homogenized. 2105 parts by weight of the premix was heated at 90° C. for 3 hours, then cooled to 26° C. for 24 hours. The polymer was about 400,000 cps viscosity. 11 parts by weight of triethanol amine were added to neutralize the catalyst, followed by 45 parts by weight TRITON X405 and 80 parts by weight 3(2-aminoethyl)aminopropyltrimethoxy silane dissolved in 23 parts by weight ETHOQUAD C/25. The emulsion was warmed to 45° C. and stripped free of methanol under 90 mm vacuum pressure. The resultant emulsion was 38% solids and cured on air drying to a detergent resistant film.

Silanol Oil Emulsion #6

A silicone emulsion was prepared using standard techniques from 762 parts by weight of a silanol-terminated PDMS fluid having a viscosity of from 2550 to 3570 cstk., 760 parts by weight of a 10,000 cstk. trimethylsiloxane-stopped dimethylpolysiloxane copolymer (VISCASIL 10M, General Electric Co.), 26 parts by weight of an ultraviolet radiation screen (UVINUL N539, BASF), 26 parts by weight TRITON X405, 38 parts by weight nonylphenoxypolyoxyethylene glycol (IGEPAL CO850, GAF), 105 parts by weight water (Part I), 2.5 parts by weight of an antimicrobial agent (DOWICIL 200, Mallinkrodt), 215 parts by weight sodium benzoate, 871 parts by weight water (Part II) and 0.1 part by weight of a silicone antifoaming agent (AF72, General Electric Co.).

The polysiloxane fluids, the ultraviolet radiation screen and the emulsifiers were blended at 50° C. Part I water containing the antimicrobial agents (DOWICIL and sodium benzoate) and added slowly to the premix. The mixture was held at 55° C. for 1 hour, then colloid milled into Part II water. This produced a final emulsion having a viscosity of 165 cps. With a solids content of 61.4%.

Silanol Oil Emulsion #7

A silanol-containing emulsion was prepared in the same manner as Emulsion #6 using the following ingredients and quantities:
600 parts by weight of the silanol-endstopped fluid
600 parts by weight VISCASIL 10M
30 parts by weight IGEPAL CO850
20 parts by weight TRITON X405
1 part by weight antimicrobial agent (6-acetoxy-2,4-dimethyl-m-dioxane, Givaudan Corp.)
2 parts by weight sodium benzoate
80 parts by weight water (Part I)
667 parts by weight water (Part II)
0.1 part by weight antifoam agent
The product was a silanol-containing emulsion having a viscosity of 260 cps. and a solids content of 62.3%.

EXAMPLE 2

Polish emulsions were prepared by blending aminofunctional emulsions (Emulsion Nos. 1–5) with silanol-containing emulsions (Emulsion Nos. 6 & 7). To formulate the polish, 11 parts by weight of an aminofunctional emulsion (or combination) were combined with 89 parts by weight of a silanol-containing emulsion.

Samples of black exterior vinyl of the type used on automobile roofs were coated with polishes prepared as described above. The polished surfaces had good "gloss", covered blemishes well and showed good detergent resistance after 4 washings. The samples prepared with ultraviolet radiation screens are additionally expected to protect the underlying vinyl from the harmful effects of sunlight.

EXAMPLE 3

A number of silanol-containing and aminofunctional silicone-containing emulsions were prepared from the following ingredients:

| Components | Description |
| --- | --- |
| silicone resin A | a resin prepared from hydrolyzed methyltrichlorosilane (General Electric Co.) |
| silicone resin B | a 70% solution of a methoxy silicone in an aromatic solvent (General Electric Co.) |
| VISCASIL | [see Example 1, above] |
| silanol fluid J | silanol-terminated PDMS fluid, 610–900 cstk. |
| aminofunctional fluid X | a polymer prepared by blending 2.6 weight percent 3-aminopropyltrimethoxysilane and 2.6 weight percent N—2-aminoethyl-3-aminopropyl-trimethoxysilane with 94.8 weight percent of a low viscosity silanol-stopped PDMS fluid to yield a methoxy-stopped copolymer |
| silanol fluid K | silanol-terminated PDMS fluid, 15,300–30,600 cstk. |
| aminofunctional fluid Y | an aminofunctional PDMS copolymer prepared from a 100 cstk. silanol PDMS fluid, N—2-aminoethyl-3-aminopropyl-trimethoxysilane and 3-aminopropyltrimethoxy silane |
| aminofunctional fluid Z | an aminofunctional PDMS copolymer prepared from a 2550–3570 cstk. silanol fluid, N—2-aminoethyl-3-aminopropyl-trimethoxysilane, mineral spirits and isopropanol |

Using various of the components listed above, several polish formulations were prepared in aluminum dishes and allowed to cure for three days at room temperature. The cured films were then evaluated in terms of firmness, stickiness, oiliness, etc.

| Components | Parts by Weight | | |
| --- | --- | --- | --- |
| Formulation 1 | (1) | (2) | (3) |
| silicone resin A | 5.0 | 5.0 | 5.0 |
| silicone resin B | 5.0 | 5.0 | 5.0 |
| VISCASIL | 1.0 | — | — |
| silanol fluid J | — | 1.0 | — |
| aminofunctional fluid X | — | — | 1.0 |
| Formulation 2 | | (4) | (5) |
| silicone resin A | | 0.3 | 0.3 |
| silanol fluid J | | 1.0 | — |
| silanol fluid K | | 0.6 | — |
| VISCASIL | | — | 1.6 |
| aminofunctional fluid X | | 1.0 | 1.0 |
| Formulation 3 | (6) | (7) | (8) | (9) |
| aminofunctional fluid Y | 1.0 | 1.0 | 2.0 | 2.0 |
| aminofunctional fluid Z | 3.0 | 3.0 | — | — |
| VISCASIL | 1.0 | — | 1.0 | — |
| silanol fluid J | — | 1.0 | — | 1.0 |

Description of Films
(1) very soft gel
(2) firmer gel
(3) firm gel
(4) very firm gel
(5) very soft gel/free oil
(6) soft gel (oily)
(7) firm gel
(8) soft tacky gel
(9) firm gel Formulations 4a–4e A series of polishes was prepared using aminofunctional fluids with silanol fluids and dimethylpolysiloxane fluids. Gloss, ease of rub-out or general ease of application and removal, and detergent resistance were measured.

| | Parts by Weight | | | | |
| --- | --- | --- | --- | --- | --- |
| Components | (a) | (b) | (c) | (d) | (e) |
| aminofunctional fluid Y | 1.0 | 1.0 | 4.0 | 4.0 | 4.0 |
| aminofunctional fluid Z | 6.0 | 6.0 | — | — | — |
| silanol fluid J | — | 1.5 | — | 2.5 | 1.5 |
| silanol fluid K | — | — | — | — | 1.0 |
| VISCASIL | 1.5 | — | 2.5 | — | — |
| surfactant | 1.0 | 1.0 | 1.0 | 1.0 | 1.0 |
| mineral spirits | 22.0 | 22.0 | 22.0 | 22.0 | 22.0 |
| calcined clay | 10.0 | 10.0 | 10.0 | 10.0 | 10.0 |
| water | 58.5 | 58.5 | 57.5 | 57.5 | 57.5 |

The above polishes were evaluated by applying each to a black painted surface, aging 24 hours and then washing with a cellulose sponge plus 3% laundry detergent solution in water. The following results were observed:

| Formulation | Gloss | Application Ease | Detergent Resistance | |
| --- | --- | --- | --- | --- |
| | | | 50 washes | 100 washes |
| a | very good | easy | fair-good | poor |
| b | good | easy | good | good |
| c | good | normal | good | fair |
| d | good | normal | excellent | good |
| e | excellent | normal | excellent | good |

The polish formulations utilizing silanol fluids showed improved resistance to detergent washing.

EXAMPLE 4

Cationic Aminofunctional Emulsion #8

525 parts by weight of a silanol-stopped dimethylpolysiloxane-methylpolysiloxane copolymer oil, 20.5 parts by weight N-2-aminoethyl-3-aminopropyltrimethoxysilane, 45 parts by weight alkylaryl polyether alcohol (TRITON X-100), 45 parts by weight trimethylcocoammonium chloride (ARQUAD C-50), 15 parts by weight ETHOQUAD C/25, 30 parts by weight glycerin and 180 parts by weight water (Part I) were blended together in a reaction vessel. The mixture was agitated until uniform at 25° C., then colloid milled (10 mil gap at 15 psig pressure). The resulting soft paste was diluted with water (Part II) to yield upon blending a 38% solid silicone emulsion, pH 9.2, 40 cps viscosity. A 40 cc sample of this emulsion was centrifuged for 30 minutes at 3,000 rpm. Only a 0.25 cc sediment, indicating a well-formed emulsion.

Cationic Emulsion #9

20 parts by weight of N-2-aminoethyl-3-aminopropyltrimethoxysilane were added to 300 parts by weight of the Emulsion #8 (above). The emulsion was agitated rapidly to disperse the additional amino silane, bringing the level up from 1.37% to 7.5% amino silane.

Aminofunctional Emulsion #10

1400 parts by weight of the cyclic tetramer, 2092 parts by weight water and 40 parts by weight dodecylbenzene sulfonic acid were blended, then homogenized at 8000 psig and then 4000 psig to ensure uniformity. The emulsion was then heated to 75°–85° C. and agitated for 3 hours. The emulsion was cooled to 35° C. for 3 hours to allow polymer viscosity to approach 300,000 cps. At the end of this cooling cycle the emulsifier-catalyst was neutralized with 40 parts by weight of triethanol amine. The resultant emulsion was pH 9.3. 380 parts by weight of colloidal silica and 5 parts by weight formalin were added. The emulsion was blended for ½-hour to yield a 37.9% solids uniform emulsion, pH 9.2.

Aminofunctional Emulsion #10a

To 100 parts by weight of the foregoing Emulsion #10 there was added a blend consisting of 2 parts by weight 3-(aminoethylamino)proponoic acid, 3-(trimethoxysilyl)propyl ester; 1 part by weight of an emulsifier blend (42.5% IGEPAL CO850, 42.5% polyethylene glycol, trimethylnonylether (TERGITOL TMN-6 and 15% water); and ½ part by weight triethanol amine. After vigorous agitation a water white aminofunctional emulsion resulted which was uniform and was found to be water dispersible.

Cationic Aminofunctional Emulsion #11

700 parts by weight of a 1000 cstk. silanol-stopped PDMS fluid, 27.4 parts by weight N-2-aminoethyl-3-aminopropyltrimethoxysilane, 60 parts by weight polysorbate-80, 20 parts by weight polysorbate-85, 15 parts by weight trimethylcocoammonium chloride, 15 parts by weight dimethyldisoyaammonium chloride, 30 parts by weight bis(2-hydroxyethyl)soyamine, and 120 parts by weight water were blended together and mixed ½-hour at room temperature. This premix was colloid milled (15 mil gap at 15 psig) into 1000 parts by weight water, 40 parts by weight glycerin and 20 parts by weight methylpolyoxyethylene(15)oleylammonium chloride, then inverted by rapid agitation and homogenized at 8000 psi. The resultant emulsion was found to be 42.4% solids. When applied to an aluminum panel, the emulsion air dried to yield a soft cured polymer system.

Aminofunctional Emulsion #12

A polymer blend was prepared comprising 69.5 weight percent of a 3000 cstk.silanol-stopped PDMS fluid, 24.3 weight percent of a 165 cstk.silanol-stopped PDMS fluid, 4.8 weight percent N-2-aminoethyl-3-aminopropyltrimethoxysilane and 1.4 weight percent 3-aminopropyltrimethoxysilane. 164 parts by weight of this blend, 110 parts by weight of a 3.5 weight percent hydroxypropyl methylcellulose solution, 7 parts by weight Triton X-100, 100 parts by weight water and 80 parts by weight odorless mineral spirits were then mixed together in a reaction vessel. The emulsion was agitated until uniform, then homogenized. The emulsion was coated on an aluminum panel and cured to a hard, abrasion resistant film.

10"×12" pieces of cotton cloth were immersed in 5% solids solutions of aminofunctional Emulsions Nos. 8, 9 and 10a. Some of the cloths were allowed to air dry, others were dried for 10 minutes at 150° C. in an air circulating oven, after being passed through a padder to remove excess emulsion. The cloths were then allowed to stand for 72 hours at room temperature. The samples were found to exhibit good hand qualities and good water resistance. The cationic emulsion samples are also expected to have improved antistatic properties and biocidal activity.

EXAMPLE 5

Preparation of Silanol Terminated Emulsion Polymer

To 700 parts by weight of octamethylcyclotetrasiloxane there was added 80 parts by weight octylphenoxypolyoxyethylene glycol (TRITON X405, Rohm and Haas) emulsifier, 20 parts by weight cocomethylpolyoxyethyleneglycol ammonium chloride (ETHOQUAD C/25) and 1117 parts by weight deionized water. The mixture was blended with an air stirrer while being confined to a 4 liter stainless steel beaker. A uniform blend was obtained in about 15 minutes. There was then added 9 parts by weight of a 45% KOH solution.

The blend was thereafter homogenized at 8000 psi by passing through a laboratory Manton-Gaulin homogenizer. 1827 parts by weight of the resultant homogenized tetramer emulsion was added to a 3 liter, 3 neck round bottom flask equipped with thermometer, thermal controller, heating mantle, condenser and mechanical stirrer. The emulsion was heated at 90°-95° C. for 6 hours to polymerize the tetramer in situ to yield a silanol terminated polydimethylsiloxane polymer. The pH of the aqueous emulsion was slightly greater than 12.

After polymerization was completed the KOH catalyst was neutralized with 4 parts by weight of acetic acid. The resultant pH was about 6.5 and the solids content was about 35 percent by weight.

EXAMPLE 6

Cationic Aminofunctional Emulsion Containing 1% Methyltrimethoxysilane

The emulsion of Example 5 was cooled to about 25° C. at which time there was added to 600 parts by weight of such emulsion a blend containing 22 parts by weight N-2-aminoethyl-3-aminopropyltrimethoxysilane, 6.3 parts by weight methyltrimethoxysilane and 3 parts by weight TRITON X100. The emulsion polymerization was then allowed to proceed for about another 1.5 hours at 40°-45° C.

This cationic aminofunctional emulsion is similar to cationic aminofunctional emulsions 1, 2 and 3 of Example 1 except that it contains about 1 percent by weight methyltrimethoxysilane.

The cationic aminofunctional emulsion was allowed to equilibrate for 3-5 days. The emulsion cures on air drying to yield a resinous detergent resistant film. The cured films of this example are much tougher than the cured films of Example 1. It is believed that this is due to the tighter cure which results from the presence of the methoxy groups.

EXAMPLE 7

Cationic Aminofunctional Emulsion Containing 3% Methyltrimethoxysilane

To another 600 parts by weight of the emulsion prepared in Example 5 there was added at 25° C. 2 parts by weight TRITON X405. The emulsion was blended until the emulsifier was completely dispersed. There was then added a blend containing 22.5 parts by weight N-2-aminoethyl-3-aminopropyltrimethoxysilane, 19.3 parts by weight methyltrimethoxysilane and 4 parts by weight TRITON X100. Emulsion polymerization was again allowed to proceed at 40°-45° C. for about 1.5 hours.

This cationic aminofunctional emulsion cures on air drying to yield a detergent resistant film that is more resinous than the films prepared from Examples 1 or 5. A film prepared from the emulsion of this example by drying a 5 gram sample at 120° F. for 24 hours was brittle and somewhat friable.

EXAMPLE 8

Cationic Aminofunctional Emulsion Containing Gamma-Methacryloxypropyltrimethoxysilane To the final 600 parts by weight of the emulsion prepared in Example 5 there was added at 25° C. a blend containing 21.8 parts by weight γ-methacryloxypropyltrimethoxysilane and 3 parts by weight TRITON X100. Emulsion polymerization was allowed to continue for another 1.5 hours at 40°–45° C.

After equilibrating for 3–5 days an emulsion was obtained which can be cured on cloth with water-soluble peroxides. This emulsion could also be copolymerized with other materials such as an acrylic emulsion to yield a novel coating.

EXAMPLE 9

Stripped Aminofunctional Cationic Emulsion of Example 6

To a 1 liter, 3 neck flask equipped with thermometer, reflux trap, thermal controller, condenser and mechanical stirrer there was added 286 parts by weight of the emulsion of Example 6. The emulsion was heated to 100° C. under atmospheric conditions whereupon 12 parts by weight of unpolymerized tetramer was removed from the emulsion.

Those skilled in the art will appreciate that it is quite unexpected that an emulsion could be heated to such a temperature without breaking down the emulsion.

A film prepared by drying a 5 gram sample of the emulsion at 120° F. for 24 hours was found to be considerably harder and tougher and less elastic than the film prepared from the emulsion of Example 6. This is believed to be due to the removal of the cyclics which act as a plasticizer.

EXAMPLE 10

Stripped Aminofunctional Cationic Emulsion of Example 7

To a 1 liter, 3 neck flask equipped as in Example 9, except that a nitrogen sparge was attached at the thermometer port, there was added about 300 parts by weight of the emulsion of Example 7. When heated to 100° C. under nitrogen sparge, 10 parts by weight of cyclic light ends were removed by azeotroping.

A film prepared by drying a 5 gram sample of the emulsion at 120° F. for 24 hours was found to be considerably harder and tougher than the film prepared from the emulsion of Example 7.

EXAMPLE 11

Stripped Aminofunctional Cationic Emulsion

Using equipment like that in Example 9, 1 pint of a cationic aminofunctional emulsion similar to those of Example 1 was stripped by heating to 100° C. and azeotroping off cyclics. About 6 percent by weight cyclics were isolated based upon the amount of polymer in the emulsion.

A film prepared by heating a 5 gram sample of the emulsion at 120° F. for 24 hours was much tougher and more elastic than films prepared from cationic aminofunctional emulsions produced by emulsion polymerization which were not stripped of cyclics.

EXAMPLE 12

Stripped Emulsion Containing Methyltrimethoxysilane

An emulsion was prepared as in Example 5 from 700 parts by weight methyl tetramer, 80 parts by weight TRITON X405, 20 parts by weight ETHOQUAD C/25, 9 parts by weight 45% KOH solution and 1117 parts by weight water. This premix was blended, homogenized and then emulsion polymerized as in Example 5. The polymerization temperature rose to greater than 96° C. causing some oil to separate and necessitating rehomogenization. The emulsion polymerization was continued for about 6 hours to yield a silanol terminated polymer.

The emulsion was cooled to about 50° C. at which time there was added to 1232 parts by weight of the emulsion a blend containing 62 parts by weight methyltrimethoxysilane and 5 parts by weight TRITON X100. Then 25 parts by weight TRITON X405 was added and the temperature raised to 60° C. Emulsion polymerization continued at this temperature for about 3 hours to yield an emulsion having a solids content of about 34 percent by weight.

837 parts by weight of the thus produced emulsion was stripped by azeotroping as in Example 10. There was removed 74 parts by weight of cyclics and water. The solids content of the stripped emulsions was found to be 38.8% by weight. Films were prepared by heating 5 gram samples of both the original and stripped emulsions at 120° F. for 24 hours. The film prepared from the original emulsion was waxy and friable, and contained some free oil. The film prepared from the stripped emulsion was still waxy and friable, but was much tougher.

EXAMPLE 13

Cationic Aminofunctional Emulsion Containing 2% Cyanoethyltrimethoxysilane

A silanol terminated polydimethylsiloxane was prepared by emulsion polymerization. To this emulsion there was added 2.1% by weight cyanoethyltrimethoxysilane, 1% by weight methyltrimethoxysilane, 0.34% by weight TRITON X100 and 0.34% by weight ETHOQUAD C/25 and the emulsion polymerization continued by heating at about 50° C. for about 2 hours.

There resulted an extremely stable emulsion which is curable to a detergent resistant coating.

Obviously, modifications and variations in the present invention are possible in light of the foregoing disclosure. For example, as can be seen from the working examples, antimicrobial agents, thickening agents, ultraviolet light screens, antifoaming agents, and other such conventional and functional additives may be added to impart their particular properties to the formulations herein. It is understood, however, that any incidental changes made in the particular embodiments of the invention as disclosed are within the full intended scope of the invention as defined by the appended claims.

I claim:

1. A composition comprising an aqueous emulsion prepared by
   (A) emulsion polymerizing
      (a) a polydiorganosiloxane in
      (b) an aqueous medium in the presence of
      (c) an emulsifier or mixture of emulsifiers and (d) optionally, a polymerization catalyst or mixture of polymerization catalysts, and (B) thereafter stripping cyclic or other low molecular weight siloxanes from said emulsion by heating.

2. A composition as in claim 1 wherein the polydiorganosiloxane is a cyclopolydiorganosiloxane.

3. A composition as in claim 2 wherein the cyclopolydiorganosiloxane has the general formula $(R_2SiO)_{3-9}$ where R is, independently, hydrogen or a substituted or unsubstituted hydrocarbon radical.

4. A composition as in claim 3 wherein substantially all of the cyclopolydiorganosiloxane is octamethylcyclotetrasiloxane.

5. A composition as in claim 1 wherein the aqueous medium is deionized water.

6. A composition as in claim 1 wherein the emulsifier is a cationic emulsifier.

7. A composition as in claim 6 wherein the emulsifier is an ether-type emulsifier.

8. A composition as in claim 6 wherein the emulsifier is an alkylphenoxypolyoxyethylene glycol, a quaternary ammonium salt or mixture thereof.

9. A composition as in claim 6 wherein the emulsifier is octylphenoxypolyoxyethylene glycol, methylpolyoxyethylene (15) cocoammonium chloride, or mixtures thereof.

10. A composition as in claim 1 wherein the polydiorganosiloxane is present in an amount ranging from about 20 to about 60 percent by weight.

11. A composition as in claim 1 wherein the polymerization catalyst is potassium hydroxide.

12. A composition as in claim 1 wherein said polydiorganosiloxane is further emulsion polymerized with an aminofunctional silane prior to stripping.

13. A composition as in claim 12 wherein the aminofunctional silane is 3-aminopropyltrimethoxysilane; N-2-aminoethyl-3-aminopropyltrimethoxysilane; N,N-diethyl-3-aminopropyltrimethoxysilane, or mixture thereof.

14. A composition as in claim 1 wherein said polydiorganosiloxane is further emulsion polymerized with an alkyltrialkoxysilane prior to stripping.

15. A composition as in claim 14 wherein the alkyltrialkoxysilane is methyltrimethoxysilane.

16. A composition as in claim 1 wherein said polydiorganosiloxane is further emulsion polymerized with a silane having an unsaturated group bonded thereto.

17. A composition as in claim 16 wherein the silane having an unsaturation group bonded thereto is γ-methacryloxypropyltrimethoxysilane, cyanoethyltrimethoxysilane or mixture thereof.

18. A composition as in claim 1 wherein said emulsifier functions as a polymerization catalyst.

19. A composition as in claim 1 wherein said polydiorganosiloxane is further emulsion polymerized with an aminofunctional silane and an alkyltrialkoxysilane.

20. A composition as in claim 1 wherein stripping of volatiles is effected by heating at about 100° C.

21. A composition as in claim 1 wherein stripping of volatiles is effected by heating under reduced pressure.

22. A composition as in claim 1 wherein stripping of volatiles is effected by azeotropic distillation.

23. A method of making an emulsion comprising:
I. emulsifying:
(a) a polydiorganosiloxane in
(b) an aqueous medium in the presence of
(c) an emulsifier or mixture of emulsifiers and
(d) optionally, a polymerization catalyst or mixture of polymerization catalysts,
II. polymerizing said polydiorganosiloxane by emulsion polymerization, and
III. stripping cyclic or other low molecular weight siloxanes from the thus produced emulsion by heating.

24. A method as in claim 23 wherein the polydiorganosiloxane is a cyclopolydiorganosiloxane.

25. A method as in claim 24 wherein the cyclopolydiorganosiloxane has the general formula $(R_2SiO)_{3-9}$ where R is, independently, hydrogen or a substituted or unsubstituted hydrocarbon radical.

26. A method as in claim 25 wherein substantially all of the cyclopolydiorganosiloxane is octamethylcyclotetrasiloxane.

27. A method as in claim 23 wherein the aqueous medium is deionized water.

28. A method as in claim 23 wherein the emulsifier is a cationic emulsifier.

29. A method as in claim 28 wherein the emulsifier is an ether-type emulsifier.

30. A method as in claim 28 wherein the emulsifier is an alkylphenoxypolyoxyethylene glycol, a quaternary ammonium salt or mixture thereof.

31. A method as in claim 28 wherein the emulsifier is octylphenoxypolyoxyethylene glycol, methylpolyoxyethylene (15) cocoammonium chloride, or mixtures thereof.

32. A method as in claim 23 wherein the polydiorganosiloxane is present in an amount ranging from about 20 to about 60 percent by weight.

33. A method as in claim 23 wherein the polymerization catalyst is potassium hydroxide.

34. A method as in claim 23 wherein said polydiorganosiloxane is further emulsified with, prior to emulsion polymerization, an aminofunctional silane.

35. A method as in claim 23 wherein after said polydiorganosiloxane is emulsion polymerized, further emulsion polymerization is effected after adding an aminofunctional silane.

36. A method as in claim 34 wherein the aminofunctional silane is 3-aminopropyltrimethoxysilane; N-2-aminoethyl-3-aminopropyltrimethoxysilane; N,N-diethyl-3-aminopropyltrimethoxysilane, or mixture thereof.

37. A method as in claim 35 wherein the aminofunctional silane is 3-aminopropyltrimethoxysilane; N-2-aminoethyl-3-aminopropyltrimethoxysilane, N,N-diethyl-3-aminopropyltrimethoxysilane, or mixture thereof.

38. A method as in claim 23 wherein said polydiorganosiloxane is further emulsified with, prior to emulsion polymerization, an alkyltrialkoxysilane.

39. A method as in claim 23 wherein after said polydiorganosiloxane is emulsion polymerized, further emulsion polymerization is effected after adding an alkyltrialkoxysilane.

40. A method as in claim 38 wherein said alkyltrialkoxysilane is methyltrimethoxysilane.

41. A method as in claim 39 wherein said alkyltrialkoxysilane is methyltrimethoxysilane.

42. A method as in claim 23 wherein said polydiorganosiloxane is further emulsified with, prior to emulsion polymerization, a silane having an unsaturated group bonded thereto.

43. A method as in claim 23 wherein after said polydiorganosiloxane is emulsion polymerized, further emulsion polymerization is effected after adding a silane having an unsaturated group bonded thereto.

44. A method as in claim 42 wherein the silane having an unsaturated group bonded thereto is γ-methacrlyloxypropyltrimethoxysilane, cyanoethyltrimethoxysilane, or mixture thereof.

45. A method as in claim 23 wherein the emulsifier and polymerization catalyst are the same compound.

46. A method as in claim 23 wherein said polydiorganosiloxane is further emulsified with, prior to emulsion polymerization, an aminofunctional silane and an alkyltrialkoxysilane.

47. A method as in claim 46 wherein the emulsifier is a cationic emulsifier.

48. A method as in claim 47 wherein the emulsifier is an ether-type emulsifier.

49. A method as in claim 23 wherein stripping of volatiles is effected by heating at about 100° C.

50. A method as in claim 23 wherein stripping of volatiles is effected by heating under reduced pressure.

51. A method as in claim 23 wherein stripping of volatiles is effected by azeotropic distillation.

52. A silicone emulsion polish composition comprising an admixture of:
I. an aqueous emulsion prepared by
  (A) emulsion polymerizing
    (a) a polydiorganosiloxane in
    (b) an aqueous medium in the presence of
    (c) an emulsifier or mixture of emulsifiers and
    (d) optionally, a polymerization catalyst or mixture of polymerization catalysts, and
  (B) thereafter stripping cyclic or other low molecular weight siloxanes from said emulsion by heating, and
II. a silicone emulsion comprising
  (a) a polydiorganosiloxane base polymer fluid having a viscosity from about 50 to about 100,000 cps. at 25° C.,
  (b) water, and
  (c) an emulsifier or mixture of emulsifiers.

53. A composition as in claim 52 wherein the polydiorganosiloxane of emulsion I is a cyclopolydiorganosiloxane.

54. A composition as in claim 52 wherein said polydiorganosiloxane of emulsion I is further emulsion polymerized with an aminofunctional silane prior to stripping.

55. A composition as in claim 52 wherein said polydiorganosiloxane of emulsion I is further emulsion polymerized with an alkyltrialkoxysilane prior to stripping.

56. A composition as in claim 52 wherein said polydiorganosiloxane of emulsion I is further emulsion polymerized with a silane having an unsaturated group bonded thereto.

57. A composition as in claim 52 wherein the emulsifier and polymerization catalyst of emulsion I are the same compound.

58. A composition as in claim 52 wherein said polydiorganosiloxane of emulsion I is further emulsion polymerized with an aminofunctional silane and an alkyltrialkoxysilane.

* * * * *